United States Patent [19]
Steinhagen

[11] 3,774,738
[45] Nov. 27, 1973

[54] TORQUE LIMITING COUPLING
[75] Inventor: Horst G. Steinhagen, Racine, Wis.
[73] Assignee: Twin Disc Incorporated, Racine, Wis.
[22] Filed: Aug. 24, 1972
[21] Appl. No.: 283,414

Related U.S. Application Data
[63] Continuation-in-part of Ser. No. 221,935, Jan. 31, 1972, Pat. No. 3,722,644.

[52] U.S. Cl. .................................. 192/56 R, 64/29
[51] Int. Cl. ........................................... F16d 43/20
[58] Field of Search ................... 192/56 R, 150; 64/29

[56] References Cited
UNITED STATES PATENTS
3,080,029    3/1963    Stober .............................. 64/29 X
3,095,955    7/1963    Orwin .............................. 192/56 R
3,305,058    2/1967    Orwin et al. ..................... 64/29 X
3,429,407    2/1969    Orwin et al. ..................... 64/29 X
3,722,644    3/1973    Steinhagen ....................... 64/29 X Primary Examiner—Allan D. Herrmann
Attorney—James E. Nilles

[57] ABSTRACT

A torque input shaft and a torque output hub are coaxially connected for relative rotation in axially fixed relation to each other. Caged coupling ball and spacing key assemblies are arranged between the hub and an axially shiftable, spring loaded coupling plate on the input shaft to provide for disengagement of the coupling under overload and for resetting upon reverse rotation of the shaft relative to the hub. Ball pockets in the hub and coupling plate are irregularly pitched to provide for single position engagement.

10 Claims, 11 Drawing Figures

TORQUE LIMITING COUPLING

This is a continuation-in-part of application Ser. No. 221,935, filed Jan. 31, 1972, now U.S. Pat. No. 3,722,644.

BACKGROUND OF THE INVENTION

This invention relates to power transmitting mechanism and it is concerned more particularly with a torque limiting coupling for connecting a pair of rotary power input and output elements in releasable drive transmitting relation with each other.

Torque limiting couplings which automatically interrupt the transmission of power from one rotary drive element to another under torsional overload have heretofore been known in many different forms. The present invention is concerned with a torque limiting coupling of the pocketed ball type wherein a circular series of coupling balls are seated in complementary ball pockets of driving and driven torque transmitting elements, and wherein the balls are forced out of the pockets against spring pressure when the driving torque acting on the balls exceeds a predetermined limit.

A torque limiting coupling of the mentioned pocketed ball type is disclosed and claimed in my earlier application Ser. No. 221,935, filed Jan. 31, 1972, now U.S. Pat. No. 3,722,644, and essentially the subject of the present invention is an improvement of said earlier coupling.

SUMMARY OF THE INVENTION

The present invention provides a torque limiting coupling which automatically interrupts the transmission of power from one rotary drive element to another under torsional overload and is of the pocketed ball type wherein a circular series of coupling balls are seated in complementary ball pockets of driving and driven torque transmitting elements, and wherein the balls are forced out of the pockets against spring pressure when the driving torque acting on the balls exceeds a predetermined limit. The improved coupling has a simplified ball cage which can be manufactured at relatively low costs; a ball pocket arrangement which does not require close manufacturing tolerances, and a biasing arrangement for the ball cage which eliminates the need for individual reset springs in some of the ball pockets.

The improved coupling results in savings of manufacturing costs, better efficiency and other advantages, particularly in the matter of resetting the coupling from its disengaged to its engaged condition.

These and other objects and advantages of the present invention will appear hereinafter at this disclosure progresses, reference being had to the accompanying drawings.

DESCRIPTION OF A PREFERRED EMBODIMENT

Figure 1:
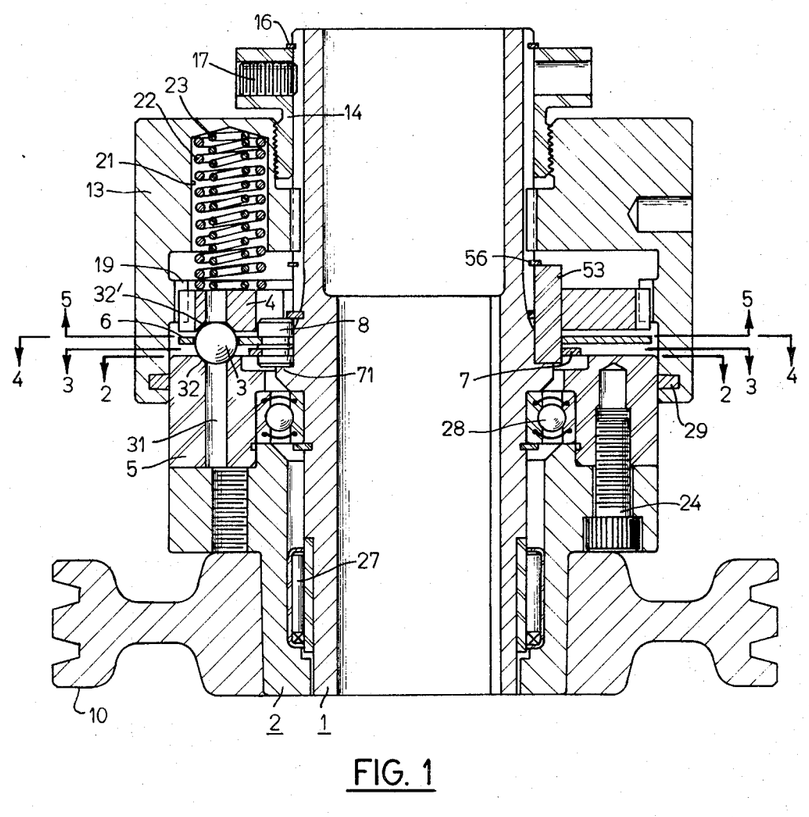
FIG. 1 is a longitudinal, cross sectional view of a torque limiting coupling embodying the present invention.

The principal component parts of the coupling shown in FIG. 1 are a hollow power input shaft 1; a power output hub 2 and associated abutment ring 5; a circular series of coupling balls 3; a spring loaded, reciprocable coupling plate 4; a ball cage 6; a key retainer ring 7 and associated spacing keys 8; and two reset springs 9 and 11 (FIGS. 4 and 7) for the key retainer ring 7.

Figure 7:
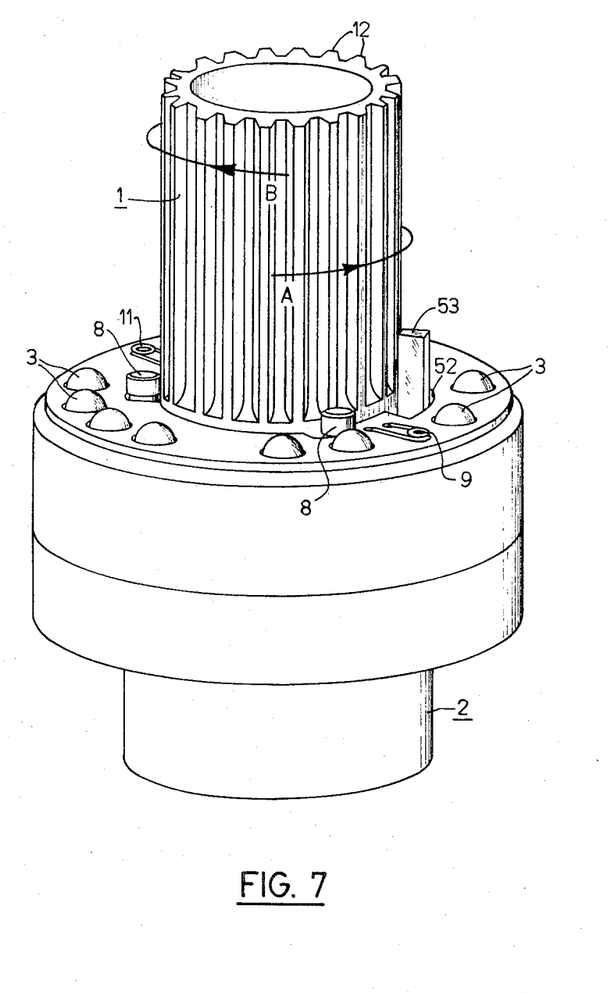
FIG. 7 is a perspective view of the coupling shown in FIG. 1 with parts omitted.

As shown in FIG. 7, the shaft 1 has a circumferential series of axial splines 12, and as shown in FIG. 1, a large diameter cup 13 is movable on the splines 12 to axially fixed positions by means of a sleeve 14 in threaded engagement with the cup. The sleeve 14 abuts a snap ring 16 on the shaft 1 and is releasably secured against rotation by a set screw 17. The coupling plate 4 has a circumferential series of external teeth 18 (FIG. 5) in cooperative, axially slideable engagement with internal teeth 19 of the cup 13. The cup 13 further has a circumferential series of axial pockets 21 each of which houses a pair of coaxial loading springs 22, 23 for the coupling plate 4. Non-rotatably secured to the hub 2 is a power transmitting element, such as a V-belt pulley 10.

The abutment ring 5 is flanged to the power output hub 2 by means of a screw bolt 24, and the hub and abutment ring assembly 2, 5 is rotatably mounted on the shaft 1 by means of a needle bearing 27 and a ball bearing 28. The ball bearing retains the hub and abutment ring assembly against axial displacement in either direction on the shaft 1. A skirt portion of the cup 13 overlaps the abutment ring 5 and carries a sealing ring 29.

As shown in FIG. 1, an axial through bore 31 of the abutment ring 5 is conically flared 90° to provide a ball pocket 32 opposite to the coupling plate 4. Another ball pocket 32' as shown in FIG. 1 is similarly provided in the face of the coupling plate 4 opposite to the abutment ring 5, the pocket 32' like the pocket 32, being formed by a 90° flare of a through bore of the coupling plate 4. In the engaged condition of the coupling as shown in FIG. 1, a coupling ball 3 is fully seated at one side in the pocket 32 and at the other side in the pocket 32', and the expanding force of the loading springs 22, 23 presses the coupling plate 4 firmly against the ball 3 which in turn is firmly pressed into the pocket 32.

Figure 2:
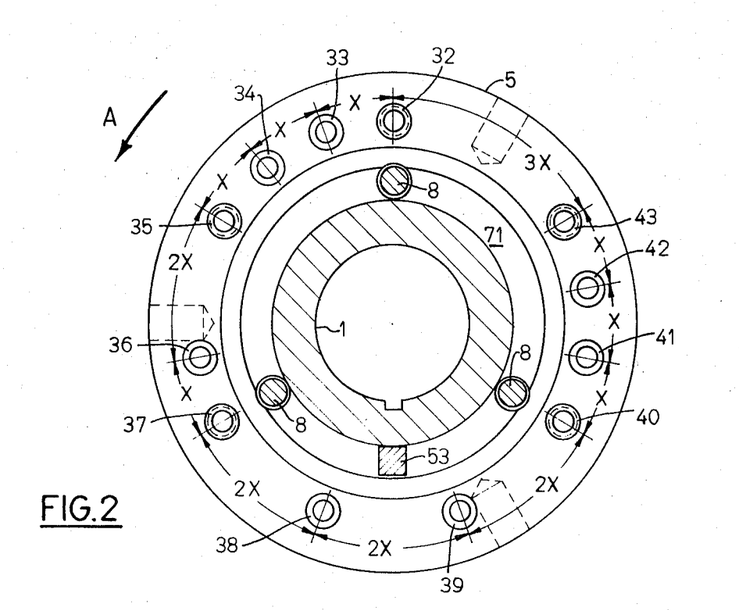
FIG. 2 is a transverse sectional view taken along line 2—2 in FIG. 1 and showing the ball engaging surface of the driven member.

As shown in FIG. 2, the abutment ring 5 has a total of twelve ball pockets like the ball pocket 32, and numbered 32–43. All of these pockets are radially equidistant from the center of the abutment ring 5 but they are irregularly spaced circumferentially according to the following pitch pattern. The pitch of the pockets 32–35 is uniform and designated X, and the pockets 36, 37 and the pockets 40–43 also have the pitch X. The pockets 35, 36, the pockets 37, 38, the pockets 38, 39, and the pockets 39, 40 have the pitch 2X; and the pockets 32, 43 have the pitch 3X.

Figure 5:
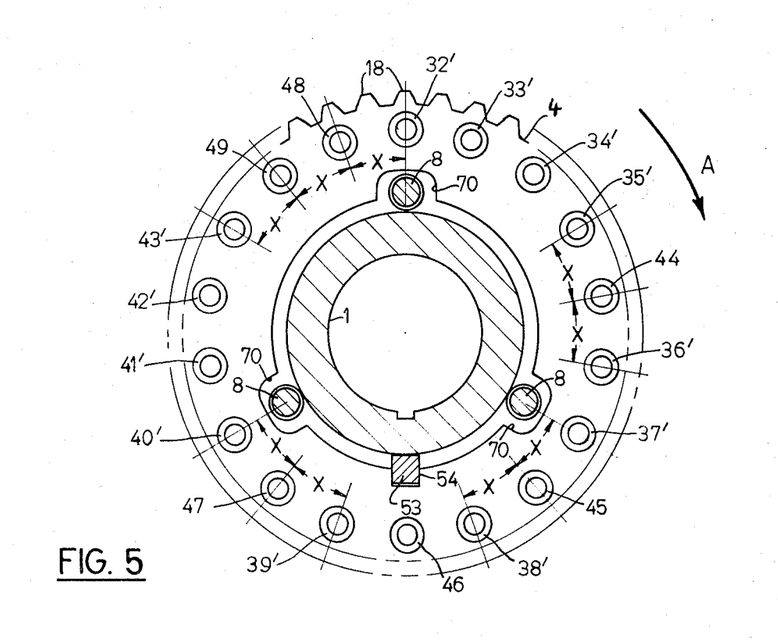
FIG. 5 is a transverse, cross sectional view along line 5—5 of FIG. 1 and showing the ball engaging surface of the reciprocable coupling plate.

As shown in FIG. 5, the coupling plate 4 has another 12 ball pockets numbered 32'–43' which correspond to and are arranged in accordance with the pitch pattern of the pockets 32–43 in the abutment ring 5. In the assembled condition of the coupling as shown in FIG. 1, in which the ball pocket 32' registers with the ball pocket 32, all of the other ball pockets 33'–43' register, respectively, with the ball pockets 33–43, and a torque transmitting ball 3 is seated in each pair of registering ball pockets. The registering relation of the ball pockets in the coupling plate 4 and the ball pockets in the abutment ring 5 exists only when the abutment ring 5 occupies a predetermine rotary position relative to the coupling plate 4. That one position of the abutment ring will hereinafter be referred to as its pocket matching position, and the corresponding position of the coupling plate 4 will be referred to as the pocket matching position of the coupling plate.

Referring again to FIG. 5, the coupling plate 4, has, in addition to the ball pockets 32'–43' six supplemental ball pockets 44–49 which, as will be explained hereinbelow, are required for disengaging the coupling and for resetting it from its disengaged to its engaged position, and which will therefore be referred to as reset pockets. The reset pockets are shaped and spaced radially from the center of the coupling plate 4 the same as the ball pockets 32'–43', they are spaced circumferentially so that the pitch of the reset pockets 44, 45, 46, 47, 48 and 49 with respect to the adjacent ball pockets is X as shown in FIG. 5. In the engaged condition of the coupling as shown in FIG. 1 the reset pockets face opposite plane surface portions of the abutment ring 5, and they are un-occupied by any of the balls 3.

Figure 4:
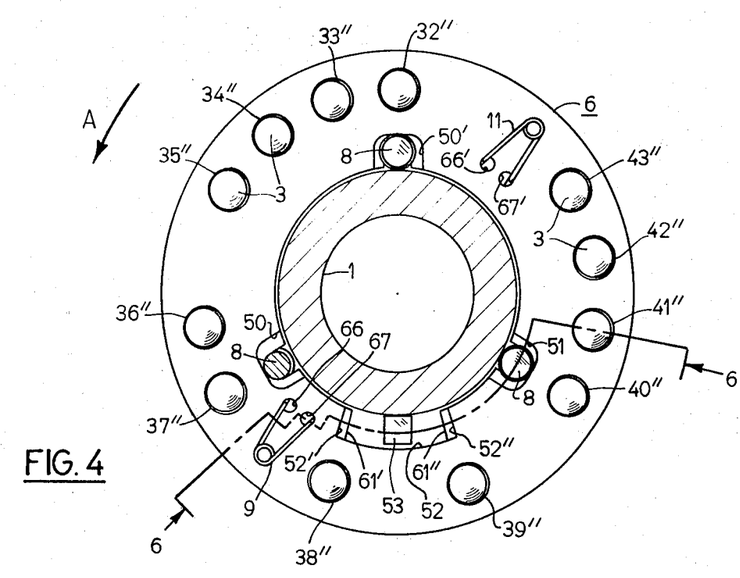
FIG. 4 is a transverse, cross sectional view along line 4—4 in FIG. 1 and showing the ball cage and associated parts.

FIG. 4 shows an axial end view of the ball cage 6, and its cooperative relation with the balls 3 and other parts including the shaft 1 and spacing keys 8. Generally, the cage 6 consists of a ring shaped plate metal disc which is rotatably supported at its inner circular edge on the shaft 1. The cage plate has an annular series of 12 circular ball receiving apertures 32''–43'', arranged in exactly the same pitch pattern as the ball pockets 32–43 shown in FIG. 2 and the ball pockets 32'–43' shown in FIG. 5. The diameter of each of the cage apertures 32''–43'' is only slightly larger than the diameter of the balls 3 so that the balls are trapped respectively in the cage apertures with only a running fit therein. At its inner periphery the cage 6 has three equally spaced radial cut-outs 50', 50 and 51, of relatively short peripheral length, and another radial cut-out 52 of appreciably greater peripheral length is provided at the inner periphery of the cage 6 between the cut-outs 50 and 51, the cut-out 52 having radial edges 52' and 52'' at its opposite ends. In the assembled condition of the parts as shown in FIGS. 1 and 4, the cage 6 occupies a rotatively adjusted position on the shaft 1 which is determined by the seating of the balls 3 in the ball pockets 32–43 and 32'–43', and which position will be referred to as the drive establishing position of the cage. The close fit of the balls in the cage apertures and the co-action of the balls with the ball pockets in the coupling plate and abutment ring obviously lock the cage against rotary displacement from its drive establishing position while the coupling is in its engaged condition as shown in FIG. 1.

While the cage is in its locked drive establishing position, its elongated cut-out 52 symmetrically straddles an axially elongated control key 53 on the outer periphery of the shaft. As shown in FIG. 1, the control key 53 is retained in axial abutment with a shoulder 71 of shaft 1 by a snap ring 56, and it is secured against circumferential displacement around the shaft by a sliding fit within a notch 54 (FIG. 5) at the inner periphery of the coupling plate 4.

Figure 3:
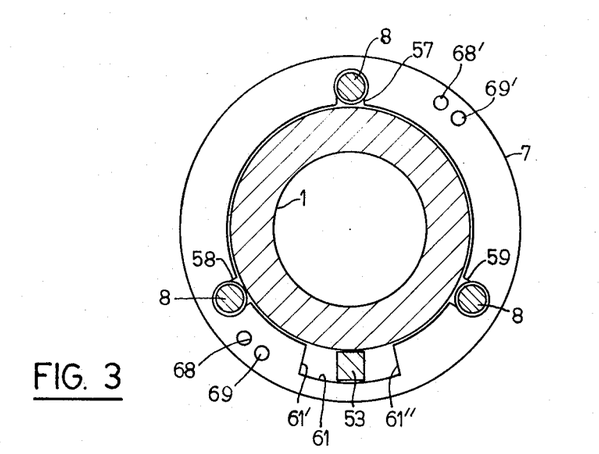
FIG. 3 is a transverse sectional view taken along line 3—3 in FIG. 1 and showing the key retainer and key assembly.

FIG. 3 shows an axial end view of the key retainer 7 and its cooperative relation with the keys 8, shaft 1 and control key 53. Generally, the retainer 7 consists of a ring shaped plate metal disc which is rotatably supported at its inner circular edge on the shaft 1. Three spacing keys 8 are closely fitted at 120 degree spacings from each other into radial notches 57, 58 and 59 at the inner periphery of the disc 7, and an arcuate cut-out 61 is formed centrally between the notches 58 and 59. The arcuate length of the cut-out 61 between its radial end edges 61' and 61'' is substantially shorter than the arcuate length of the cage cut-out 52 (FIG. 4).

Each of the spacing keys 8 is generally cylindrical in shape and, as best shown in FIGS. 8 to 11, is provided with two peripheral grooves 62, 63 which leave a radial shoulder 64 between head portions 60 and 65. The notches 57, 58 and 59 (FIG. 3) of the ring 7 are snugly seated in the groove 62 of the respective key 8, and the cut-outs 50', 50 and 51 (FIG. 4) of the cage 6 straddle the groove 63 of the respective key 8. While the keys 8 have a snug fit in the notches 57, 58 and 59, respectively, of the ring 7, the keys have limited circumferential play in the cage cut-outs 50', 50 and 51, respectively.

Figure 6:
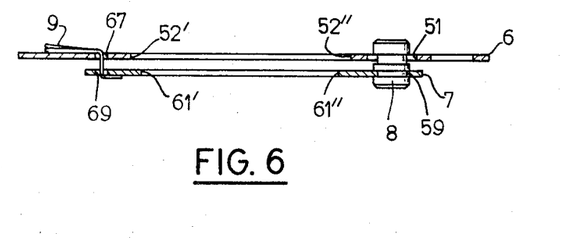
FIG. 6 is a developed sectional view along line 6—6 of FIG. 4 and showing the ball cage and key retainer assembly.

The reset springs 9 and 11 shown in FIGS. 4 and 7 yieldingly retain the key retainer ring 7 in a circumferentially centered position relative to the ball cage 6. As shown in FIGS. 4 and 6, the spring 9 has a pair of diverging arms which at their free ends extend through circumferentially spaced holes 66 and 67 (FIG. 4) of the cage 6 and through circumferentially spaced holes 68 and 69 (FIG. 3) of the key retainer ring 7. In its installed position the spring 9 is under initial tension which urges its arms apart and into engagement not only with the edges of the holes 66, 67, respectively of the cage but also into engagement with the edges of holes 68 and 69, respectively, of the key retainer ring 7. As a result, the ring 7 is yieldingly retained in a rotatively adjusted position relative to the cage 6, in which the retainer cut-out 61 registers symmetrically with the cage cut-out 52, as shown in FIG. 4. While the ring 7 occupies that rotatively centered position, its cut-out 61 symmetrically straddles the control key 53 the same as the cage cut-out 52, but since the arcuate length of the ring cut-out 61 is shorter than the arcuate length of the cage cut-out 52, the ring edges 61', 61'' are spaced peripherally shorter distances from the key 53 than the cage edges 52', 52''.

The reset spring 11 diametrically opposite to the reset spring 9 provides additional torque to keep the key retainer ring 7 yieldingly centered in the same manner as the reset spring 9.

Figure 8:
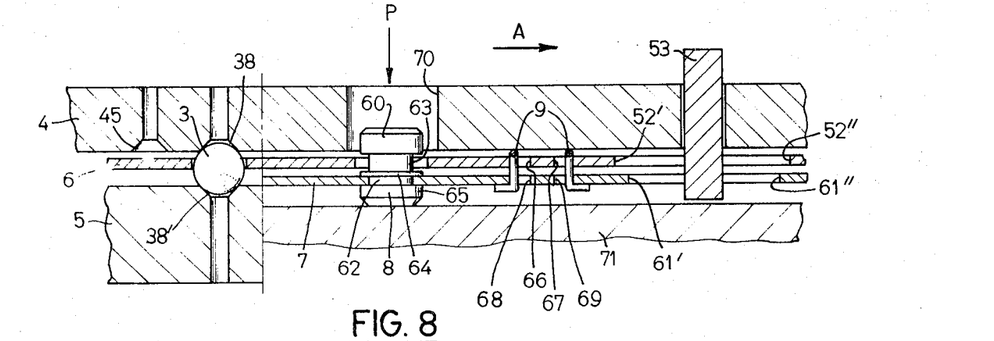
FIG. 8 is a develped sectional view generally along line 6—6 of FIG. 4 showing parts in addition to those shown in FIG. 4.

In FIG. 8 portions of the coupling plate 4, abutment ring 5, cage 6, and other parts are shown in their operative relation to each other which exists when the coupling is in its engaged condition as shown in FIG. 1. FIG. 8 shows one of the balls 3 seated in the registering pockets 38, 38' and it shows the cage 6 in its drive establishing position which places its cut out 52 and the ring cut-out 61 into symmetrical straddling relation to the control key 53 in accordance with FIG. 4.

The play of the key 53 within the cage cut-out 61 provides a lost motion torque transmitting connection between the shaft 1 and the cage 6; and the play of the key 53 within the retainer ring cut-out 61 provides a lost motion torque transmitting connection between the shaft 1 and the spacing key assembly.

In FIG. 8 the spacing key retainer ring 7 is shown in its centered position relative to the cage 6 in which it is held by the reset springs 9 and 11 in accordance with FIG. 4. FIG. 8 further shows one of the cut-outs 70 (FIG. 5) at the inner periphery of the coupling plate 4. While the cage 6 is in its drive establishing position and the key retainer ring is in its centered position relative to the cage 6, the heads 60 of the spacing keys 8 are accommodated by the cut-outs 70, respectively, of the coupling plate 4 as shown, for one of the keys 8 in FIG. 8, the arcuate length of each cut-out 70 being somewhat greater than the diameter of the head 60 of the accommodated spacing key 8.

In the engaged condition of the coupling as shown in FIGS. 1 and 8 driving torque may be transmitted to the hub 2 from the shaft 1 in one direction or the other as indicated by the arrows A and B in FIG. 7. If the torque is applied in the direction of arrow A in FIG. 7, the coupling plate 4 tends to move with the shaft 1 in the direction of arrow A in FIGS. 2 and 8 in unison with the abutment ring 5. When the torque in the direction of arrow A exceeds the limit which is determined by the pressure P exerted by the loading springs 22, 23 upon the coupling plate 4, the plate 4 starts moving in the direction of arrow A in FIG. 8 relative to the abutment ring 5 with the result that it forces the ball 3 out of the ring pocket 38' in the direction of arrow A. As the ball 3 rides out of the pocket 38' and upon the plane face of the abutment ring 5 in the direction of arrow A, it is also forced to ride out of plate pocket 38 in the opposite direction and into engagement with the plane surface of the coupling plate between plate pocket 38 and the reset pocket 45. At the same time a corresponding displacement of the balls relative to the coupling plate and abutment ring occurs at all the other ball pockets with the result that the coupling plate 4 is forced away from the abutment ring against the pressure of the loading springs 22, 23 to a distance equal to the diameter of the balls. This condition is illustrated by FIG. 9.

Axial movement of the coupling plate 4 away from the abutment ring 5 also increases the axial spacing between the coupling plate and the shaft shoulder 71, the final spacing being greater than the axial length of the spacing keys 8. As the coupling plate continues to move in the direction of arrow A relative to the abutment ring 5 and the balls roll on plane surface portions of the coupling plate and abutment ring, the cage together with the spacing key assembly follow the movement of the coupling plate in the direction of arrow A but at reduced speed. That means that the circumferential spacing between the ball 3 and the plate pocket 38 increases and the circumferential spacing between the ball 3 and the reset pocket 45 correspondingly decreases as the coupling plate 4 rotates in the direction of arrow A relative to the abutment ring 5. At the same time, the spacing between the control key 53 and the edge 61'' of the spacing key ring cut-out 61 decreases.

The arcuate length of the spacing ring cut-out 61 is such that during rotation of the plate 4 relative to the cage and spacing ring assembly in the direction of arrow A the control key 53 hits the edge 61'' of the retainer ring 7 somewhat before the cage assembly arrives in a position in which the ball 3 registers with the reset pocket 45. As a result, the spacing key assembly will be rotatively displaced relative to the cage 6 in opposition to the pressure of the reset springs 9 and 11. Such rotary displacement of the retainer ring 7 relative to the cage 6 is limited by engagement of the key 53 with the end edge 52'' of the cage cut-out 52. While the retainer ring 7 is held in its rotatively displaced position in opposition to the pressure of the reset springs 9 and 11, the springs react, in effect between the shaft 1 and the cage 6 so as to urge the latter circumferentially of the shaft in the direction of arrow A in FIG. 4. Such circumferential bias of the cage relative to the shaft performs an important function in resetting the coupling as will be explained hereinbelow.

Figure 9:
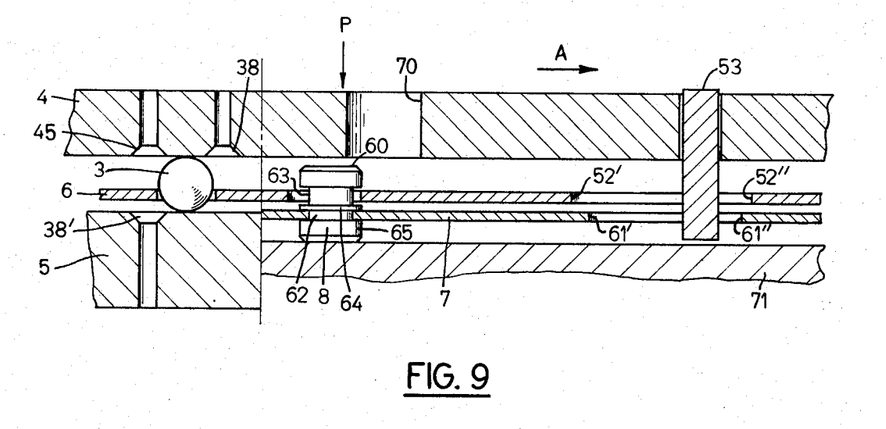
FIGS. 9 and 10 are views similar to FIG. 8 and illustrate the disengagement of the coupling from its engaged condition.

Disengagement of the clutch is completed by rotation of the coupling plate 4 relative to the cage 6 in the direction of arrow A in FIGS. 4 and 9 until the reset pocket 45 registers with the ball 3 which has rolled out of the coupling plate pocket 38. At that moment the reset pockets 44, 46, 47, 48 and 49 will also each register with a ball in the cage 6, and the coupling plate 4 will snap back toward the abutment ring 5 under the pressure of the loading springs 22, 23. However, such return movement of the coupling plate will be limited by the spacing keys 8 which have cleared the cut-outs 70 of the coupling plate while the latter is forced away from the abutment ring by the balls 3, and have then been moved into spacing position between the shaft shoulder 71 and coupling plate 4 as shown in FIG. 9 due to rotation of the coupling plate 4 in the direction of arrow A relative to the cage.

Figure 10:
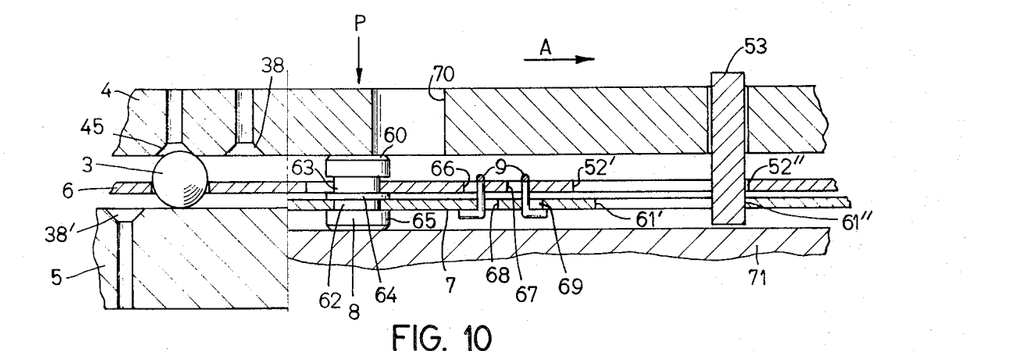

FIG. 10 shows the disengaged condition of the clutch in which the pressure P of the loading springs 22, 23 is taken up on the shaft shoulder 71 by means of the spacing keys, and in which condition a ball 3 is partially seated in the reset pocket 45. The other balls are likewise partially seated in ball pockets of the coupling plate and the shaft 1 may therefore freely rotate relative to the hub 2 in the direction of arrow A, and the hub 2 may freely rotate relative to the shaft 1 in the opposite direction.

Figure 11:
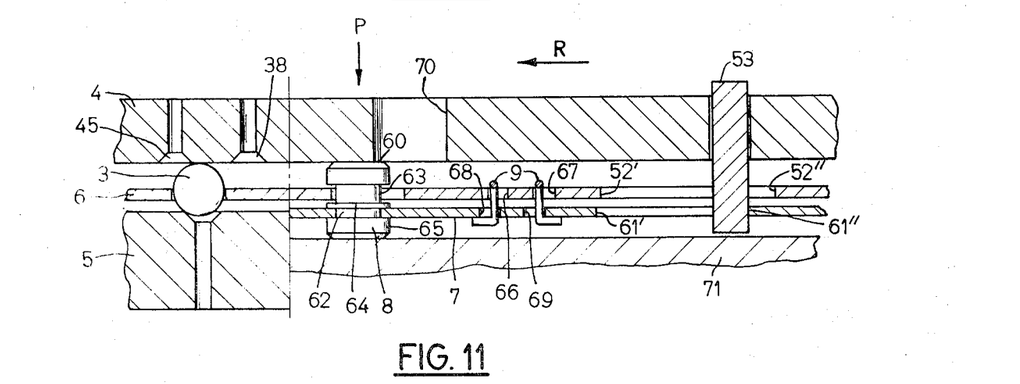
FIG. 11 is another view similar to FIG. 8 and illustrates the resetting of the coupling from its disengaged to its engaged condition.

Resetting of the coupling is effected by relative rotary displacement of the shaft and hub 2 in a direction opposite to that in which the shaft and hub are relatively displaced during disengagement of the coupling. FIG. 11 shows a condition to which the coupling plate 4, cage 6 and spacing key assembly 7,8 may be adjusted by rotation of the coupling plate in the direction of arrow R relative to the abutment ring 5 from the position in which the coupling plate is shown in FIG. 10. Torque application to the coupling plate 4 in the direction of arrow R while hub 2 is kept stationary and the coupling is in its disengaged position as shown in FIG. 10 urges the reset pocket 45 against the ball which in turn is urged in the opposite direction against the reset pocket by the cage 6 under the pressure of the reset springs 9 and 11. The length of the spacing keys 8 is designed so that the frictional forces combined with the reset spring forces will not overcome the spring force P acting on coupling plate 4. The coupling stays disengaged as shown in FIG. 10 until the ball pocket spacing in the abutment ring 5 (FIG. 2) matches the ball spacing in cage 6 (FIG. 4). In this position the reset spring tension rotates cage 6 and thus balls 3 relative to coupling plate 4. This causes the balls to leave the reset pockets in coupling plate 4 and enter the ball pockets in abutment ring 5 (FIG. 11). Further rotation in direction of arrow R will force the balls and spacing keys 8 to slide on the face of coupling plate 4 until the balls return into their original position in coupling plate 4, thereby placing the coupling into its fully engaged position as shown in FIGS. 1 and 8.

Alternately, instead of turning the coupling plate 4 in the direction of arrow R relative to the abutment ring 5, the abutment ring 5 could be turned in the direction of arrow A relative to the coupling plate 4 in order to reset the coupling from its disengaged to its engaged condition.

If the driving torque is applied to the shaft 1 in the direction of arrow B in FIG. 1, disengagement and resetting of the coupling may obviously be effected in a manner analogous to that which has bsen described hereinbefore with reference to FIGS. 8 to 11. The reset pocket 48 (FIG. 5) provides for unloading of the coupling ball which rolls out of the registering ball pockets 32, 32' when the coupling becomes disengaged under excessive torque in the direction of arrow B in FIG. 7.

If it is desired to change the torque limit at which the coupling disengages itself, it may readily be increased by adjustment of the cup 13 toward the hub 2, and decreased by adjustment of the cup away from the hub.

I claim:

1. A torque limiting coupling comprising a pair of torque input and output elements coaxially connected for relative rotation in axially fixed relation to each other; a caged ball assembly rotatably mounted on said input element in cooperative relation to a circumferential series of ball pockets in said output element; an axially reciprocable, spring loaded coupling plate mounted on said input element for rotation therewith at the side of said ball assembly remote from said output element and having a circumferential series of ball pockets in cooperative relation to said ball assembly, lost motion torque transmitting connecting means operatively interposed between said input element and said ball assembly; a spacing key assembly mounted at one side of said ball assembly in rotatable relation thereto and having a lost motion torque transmitting connection with said input element, and resilient means operatively interposed between said ball and spacing key assemblies so as to yieldingly oppose rotation of one of said ball and spacing key assemblies relative to the other.

2. A torque limiting coupling as set forth in claim 1, wherein the number of ball pockets in said output element differs from the number of ball pockets in said coupling plate.

3. A torque limiting coupling as set forth in claim 1 wherein said output element and said coupling plate have different numbers of ball pockets, one being equal to and the other being greater than the number of balls of said ball assembly.

4. A torque limiting coupling as set forth in claim 3 wherein the number of ball pockets in said output element is equal to the number of balls of said ball assembly.

5. A torque limiting coupling as set forth in claim 1 wherein said balls and ball pockets in said output element and coupling plate are irregularly pitched to provide a single position torque transmitting relation between said input and output elements.

6. A torque limiting coupling as set forth in claim 1 wherein said lost motion connecting means between said input element and said ball assembly limit rotary displacement of said ball assembly in circumferentially opposite directions from its drive establishing position.

7. A torque limiting coupling as set forth in claim 6, wherein said resilient means retain said spacing key assembly in a predetermined rotatively adjusted position relative to said ball assembly from which said key assembly may be displaced in circumferentially opposite directions.

8. A torque limiting coupling comprising a pair of radially inner and outer torque transmitting elements connected for relative rotation in axially fixed relation to each other; a cup element non-rotatably mounted on said inner torque transmitting element in axially fixed and overlapping relation to said outer torque transmitting element; an annular ball cage rotatably mounted in the space between the bottom of said cup element and an axially opposite radial face of said outer torque transmitting element; an annular series of coupling balls rotatably seated in circular openings of said ball cage and in cooperative relation to an annular series of ball pockets in said radial face of said outer torque transmitting element; means affording a lost motion torque transmitting connection between said inner torque transmitting element and said cage; an annular coupling plate reciprocably mounted in the space between said ball cage and the bottom of said cup element in non-rotatable relation to the latter and having an annular series of ball pockets in cooperative relation to said coupling balls; spring means operatively interposed between said cup element and coupling plate so as to urge the latter axially against said balls; an annular, circumferentially rockable spacing key assembly operatively interposed between said inner torque transmitting element and said coupling plate; lost motion connecting means between said spacing key assembly and said inner torque transmitting element; and spring means torsionally reacting between said cage and spacing key assembly to yieldingly oppose rocking of the latter relative to said cage.

9. A torque limiting coupling as set forth in claim 8 wherein said lost motion torque transmitting connection between said inner torque transmitting element and said cage comprises an axial key member non-rotatably connected with said inner torque transmitting element and straddled by a peripheral cut out of said cage.

10. A torque limiting coupling as set forth in claim 8, wherein an axial key member non-rotatably connected with said inner torque transmitting element is straddled by a circumferential cut out of said cage, and wherein said spacing key assembly comprises a ring element having a circumferential cut out straddling said key member so as to afford said lost motion connection between said inner torque transmitting element and said cage, and so as to provide said lost motion torque transmitting connecting means between said inner torque transmitting element and said spacing key assembly.

* * * * *